United States Patent [19]

Serbent et al.

[11] 4,220,631

[45] Sep. 2, 1980

[54] PROCESS OF CALCINING LIMESTONE OR HYDRATED LIME IN A ROTARY KILN

[75] Inventors: Harry Serbent, Hanau; Heinz Eichberger, Frankfurt am Main; Hermann Lommert, Neu-Isenburg; Herbert Lausch, Frankfurt am Main; Horst Steinhöfel, Neu Anspach, all of Fed. Rep. of Germany

[73] Assignee: Metallgesellschaft Aktiengesellschaft, Frankfurt, Fed. Rep. of Germany

[21] Appl. No.: 898,255

[22] Filed: Apr. 20, 1978

[30] Foreign Application Priority Data

Apr. 30, 1977 [DE] Fed. Rep. of Germany ....... 2719348

[51] Int. Cl.² .................. C01F 11/04; C01F 11/06
[52] U.S. Cl. .................... 423/175; 423/177; 423/636; 423/637
[58] Field of Search ............... 423/175, 177, 637, 636

[56] References Cited

U.S. PATENT DOCUMENTS

| 2,941,791 | 6/1960 | Wienert | 75/34 |
| 3,617,583 | 11/1971 | Moss et al. | 423/637 |
| 3,722,867 | 3/1973 | Butler | 423/175 |

Primary Examiner—Wayne A. Langel
Attorney, Agent, or Firm—Sprung, Felfe, Horn, Lynch & Kramer

[57] ABSTRACT

A process for the calcining of limestone or hydrated lime by thermal treatment thereof with hot gases in an oxidizing atmosphere in a rotary kiln through which the kiln atmosphere and the charge are countercurrently passed, which kiln is fed with fuel from shell burners, is described. The invention resides in the use of different fuels which release different quantities of $SO_2$ and $SO_3$ per unit of calorific heat. The fuel which releases the larger quantity of $SO_2$ or $SO_3$ per unit value of calorific heat is supplied to the upper portion of the rotary kiln, and the fuel which releases the smaller quantity of $SO_2$ and $SO_3$ per unit of calorific heat is supplied to the lower portion of the rotary kiln.

7 Claims, 1 Drawing Figure

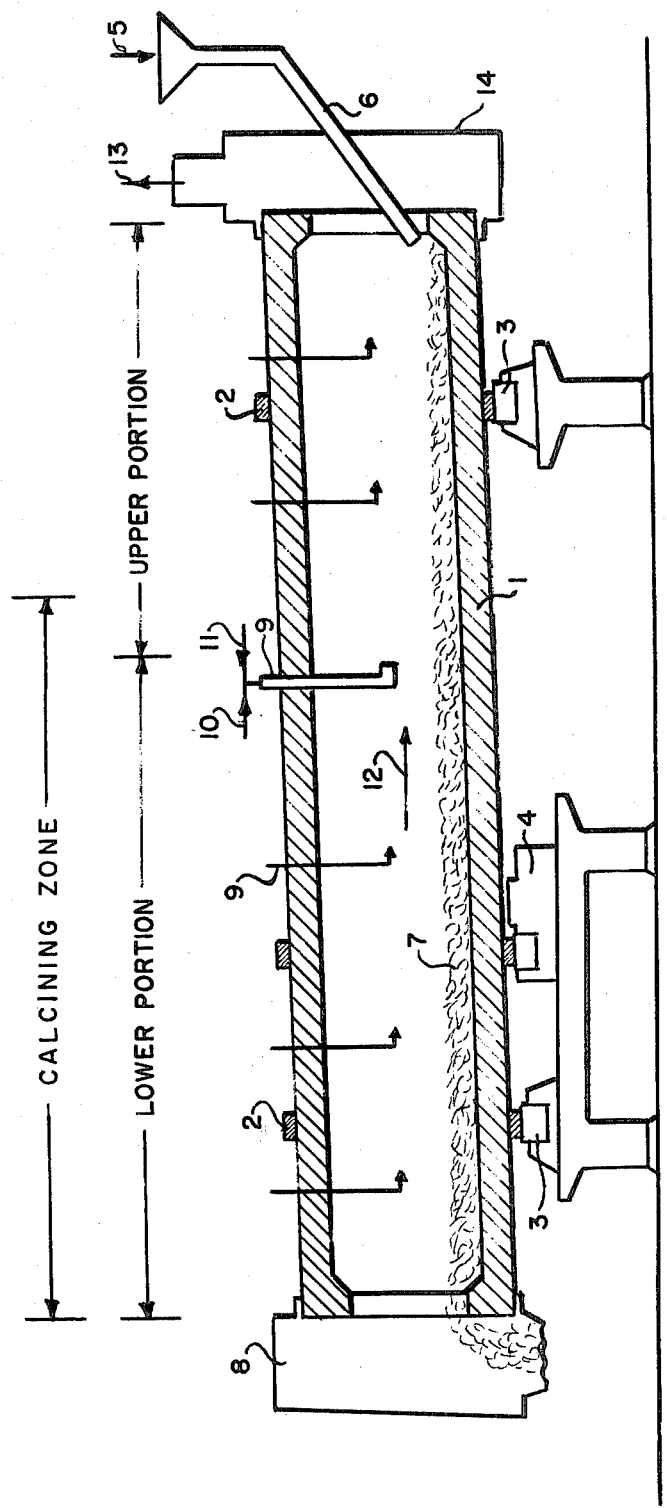

PROCESS OF CALCINING LIMESTONE OR HYDRATED LIME IN A ROTARY KILN

BACKGROUND OF THE INVENTION

This invention relates to a process of calcining limestone or hydrated lime by a thermal treatment with hot gases in an oxidizing atmosphere in a rotary kiln through which the kiln atmosphere and the charge are countercurrently conducted and which is fed with fuel through shell burners.

DISCUSSION OF THE PRIOR ART

The rotary kiln is increasingly used to produce quicklime of high reactivity from limestone or hydrated lime because lime of higher quality is better produced therein than in a shaft kiln. On the other hand, the rotary kiln has a higher heat consumption. Such lime is often used in steel production and should have only a low sulfur content. The sulfur content is mainly due to the sulfur content of the fuels employed. The sulfur content of quicklime is minimized mainly by the use of fuels having a low sulfur content (Zement-Kalk-Gips, No. 2, 1969, pp. 75-81). Because fuels having a low sulfur content are more expensive than fuels having a high sulfur content, the use of the former adds to the costs of the process, particularly owing to the higher heat consumption of the rotary kiln. From French Pat. No. 1,487,240; U.S. Pat. No. 2,941,791; and German Pat. No. 618,872 it is known to supply fuels into the kiln through shell burners or shell nozzles. It is also known to minimize the sulfur content of the quicklime in that the latter is calcined in a neutral or reducing atmosphere (German Pat. No. 1,108,603). In such process, the central burner arranged at the discharge end of the kiln can be operated with an oxygen deficiency if part of the oxygen is supplied to the kiln at a succeeding point through shell openings (Czechoslovakian Pat. No. 127,978). On the other hand, a calcination in a neutral or reducing atmosphere involves a risk of temperature fluctuations and local overheating if the oxygen supply varies. For this reason the kiln must be very well sealed to prevent an inleak of air, but even expensive sealing means cannot completely prevent such air inleak.

It is an object of the invention to produce a quicklime which has a high reactivity and a low sulfur content in a process which involves low fuel costs and can be carried out with inexpensive equipment.

This object is accomplished according to the invention in that different fuels which serve to produce hot gases and which release $SO_2$ and $SO_3$ in different quantities per unit of calorific value are introduced into the rotary kiln in such a manner that the fuel which releases a larger quantity of $SO_2$ and $SO_3$ per unit of calorific value is supplied to the upper portion of the rotary kiln and the fuel which releases a smaller quantity of $SO_2$ and $SO_3$ per unit of calorific value is supplied to the lower portion of the rotary kiln. The upper portion of the rotary kiln extends from the charging end toward the discharge end. The lower portion extends from the discharge end toward the charging end. The fuel which is supplied to the upper portion of the rotary kiln through shell burners may be gaseous. Alternatively, solid fuel in the form of dust may be supplied through the shell burners. Additionally, a portion of the fuel may be charged as solid fuel into the charging end of the rotary kiln if that fuel releases $SO_2$ and $SO_3$ only in small quantities, e.g. less than 0.25 mg S/kJ (milligram sulfur per kilo Joule). The lower portion of the rotary kiln may be supplied with fuel through shell burners and/or a central burner. That fuel can also consist of a gas, liquid or dust. Part or all of the fuel to be supplied to the lower portion of the rotary kiln may be supplied in lump form and may be pneumatically or mechanically thrown into the kiln from the discharge end and may thus be distributed on the charge, provided that such fuel releases only small quantities of $SO_2$ and $SO_3$. All of the oxygen-containing gases required to burn the carbonaceous fuels generally air can be supplied through the shell burners and/or the central burner. Alternatively, part of the oxygen-containing gases may be supplied through shell tubes, particularly when solid fuel is supplied to the charge of the rotary kiln.

The permissible sulfur content of the fuels will depend on the requirements to be met regarding the sulfur content of the quicklime, and on the quantities in which $SO_2$ and $SO_3$ are released from the fuels. Where solid fuels are used, the quantities in which $SO_2$ and $SO_3$ are released depend on the basicity of the ash which is present, i.e., on the ratio of $CaO$ to $SiO_2$ in said ash. A higher ratio of $CaO$ to $SiO_2$ results in a release of $SO_2$ and $SO_3$ in smaller quantities and vice versa. That behavior may be influenced in the desired sense by addition of basic (alkaline) components. The difference between the quantities in which $SO_2$ and $SO_3$ are released by the fuels supplied to the upper and lower portions of the rotary kiln depends also on the quantity of sulfir which enters the lime and the desired sulfur content of the lime. The terms "shell burner" and "shell tubes" describe radially extending burners and tubes, respectively, which extend radially through the shell of the kiln and have outlet openings disposed approximately at the center of the kiln and extending approximately parallel to the longitudinal axis of the kiln.

According to a preferred feature of the invention, the fuel supplied to the lower portion of the rotary kiln releases at least 30% less $SO_2$ and $SO_3$ per unit of calorific value than the fuel supplied to the upper portion of the rotary kiln. This practice results in a lime having a low sulfur content and permits of the supply of fuels which release $SO_2$ and $SO_3$ in relatively large quantities to the upper portion of the rotary kiln.

According to a preferred feature, the upper portion of the rotary kiln includes the length portion from the charging end to that point at which 50-90%, preferably 80-90% of the $CO_2$ content or the water of hydration content of the charge have been driven off. As a result, only a small quantity of sulfur from the larger quantities of $SO_2$ and $SO_3$ released by the fuel per unit of the calorific value enters the lime.

According to a preferred feature, the oxygen-containing gases required for burning the fuels are supplied through shell tubes and/or shell burners at controlled rates in such a manner that the charge is maintained throughout the length of the calcining zone at a temperature of 900°–1100° C., preferably 950°–1050° C. This results in a quicklime which has a high reactivity and a low sulfur content.

According to a preferred feature, the length of the calcining zone is at least 50% and preferably 55-70% of the kiln length. Particularly good results are produced with a calcining zone having that length. The calcining zone may have a length of about 90% of the length of the kiln if the latter is fed with a highly preheated charge.

BRIEF DESCRIPTION OF THE DRAWING

The attached drawing shows schematically a typical rotary kiln which can be used in the process of this invention. According to the drawing there is shown a rotary furnace 1 which is suspended on curved rails 2 for rotary movement. Curved rails 2 are supported by rail supports 3. The rotary furnace 1 is rotated by a driving mechanism 4 consisting of a motor and a ring gear. The charge 5 is charged through supply conduit 6 into the charging end of the kiln 1. The bed 7 of the charge travels through the kiln 1 and is discharged from the discharge end of the kiln and head 8. Shell burners 9 are disposed along the length of the kiln, which are fed through conduit 10 with fuel and through conduit 11 with oxygen containing gas (only shown for one shell burner 9). The kiln atmosphere moves in the direction of arrow 12 and the waste gas 13 leaves the kiln through head 14.

The shell burners 9 in the upper portion U of the kiln 1 are fed with a fuel which releases a larger quantity of $SO_2$ and $SO_3$ per unit of calorific value and the shell burners in the lower portion L are fed with a fuel which releases a higher quantity of $SO_2$ and $SO_3$. The length of the upper portion U is adjusted such that 50% to 90% of the $CO_2$ content or the water of hydration content of the charge are driven off in this portion. The calcining zone C has a temperature of the charge from 900° to 1100° C. and a length of 55–70% of the kiln length and can have a length of about 90% if the charge is fed in a highly preheated condition. The beginning of the calcining zone C can about coincidence with the beginning of the lower zone L if the length of the upper zone U is chosen such that a low percentage of the $SO_2$ content or the water of hydration content of the charge is driven off in zone U. If a high percentage is driven off in zone U, than zone C overlaps the last part of zone U.

The FIGURE is not shown in true size and the positions and number of shell burners is also shown only schematically.

The advantages of the invention reside mainly in that fuels which release $SO_2$ and $SO_3$ in relatively large quantities may be used to produce a quicklime which has a high reactivity and a low sulfur content in a process which involves low fuel costs and a low structural expenditure.

EXAMPLE

Limestone containing 53% CaO was treated in a pilot rotary kiln in oxidizing atmosphere with hot gas which was produced by combustion of fuel oil. The calcining temperature was 980° C.

In a first run the total thermal treatment was performed with hot gases produced by combustion of fuel oil which contained 5% sulfur. The calcined product contained 0.5% $CO_2$ and 0.17% S.

In a second run the limestone was first treated with the same gas until 80% of its $CO_2$-content were driven off. Then the treatment was performed with hot gas produced by combustion of fuel oil containing 0.5% sulfur. The calcined product contained 0.5% $CO_2$ and the highest sulfur content was 0.05%.

In other runs it was found that the fuel oil used in the lower portion of the rotary kiln should have not more than 0.25 mg S/kJ in order to obtain a calcined product having low contents of $CO_2$ and S, whereas the fuel used in the upper portion of the kiln can have above 0.8 mg S/kJ.

We claim:

1. In a process for calcining limestone or hydrated lime by thermal heating of the same with hot gases in an oxidizing atmosphere in a rotary kiln through which the kiln atmosphere and the limestone or hydrated lime charge are countercurrently conducted, which kiln is supplied with fuel through shell burners, the improvement which comprises employing different fuels for producing said hot gases, said fuels releasing different quantities of $SO_2$ and $SO_3$ per unit of calorific heat, the fuel which releases the larger quantity of $SO_2$ or $SO_3$ per unit of calorific heat being supplied to the upper portion of the rotary kiln, said upper portion being the length portion of said rotary kiln from the charging end of the rotary kiln to the point at which 50 to 90% of the $CO_2$ content or the water of hydration content of the charge is driven off and the fuel which releases the smaller quantity of $SO_2$ and $SO_3$ per unit of calorific heat being supplied to a lower portion of the rotary kiln.

2. A process according to claim 1 wherein the oxygen containing gas required for burning fuels is supplied through shell tubes and/or shell burners at controlled rates in such a manner that the charge is maintained throughout the length of the calcining zone at a temperature of 900°–1100° C.

3. A process according to claim 2 wherein the length of the calcining zone is 50% of the kiln length.

4. A process according to claim 3 wherein the length of the calcining zone is 55 to 70% of the kiln length.

5. A process according to claim 2 wherein said charge is maintained at a temperature between 950° and 1050° C.

6. A process according to claim 1 wherein the fuel supplied to the lower portion of the rotary kiln releases at least 30% less $SO_2$ and $SO_3$ per unit of calorific heat than the fuel supplied to the upper portion of the rotary kiln.

7. A process according to claim 1 wherein the upper portion of the rotary kiln includes the length portion from the charging end to the point at which 80 to 90% of the $CO_2$ content or water of hydration content of the charge have been driven off.

* * * * *